United States Patent [19]

Sato

[11] Patent Number: 4,742,238

[45] Date of Patent: May 3, 1988

[54] NON-LINEAR PHOTOELECTRIC CONVERTING APPARATUS WITH MEANS FOR CHANGING DRAINAGE PERFORMANCE

[75] Inventor: Yuichi Sato, Tokyo, Japan

[73] Assignee: Canon Kabushiki Kaisha, Tokyo, Japan

[21] Appl. No.: 914,167

[22] Filed: Oct. 1, 1986

[30] Foreign Application Priority Data

Oct. 2, 1985 [JP] Japan .................. 60-220874
Oct. 2, 1985 [JP] Japan .................. 60-220875
Oct. 2, 1985 [JP] Japan .................. 60-220876

[51] Int. Cl.$^4$ .......................................... H04N 3/14
[52] U.S. Cl. ............................ 250/578; 358/213.28
[58] Field of Search ............... 250/578; 358/213.26, 358/213.27, 213.28, 213.29, 213.31

[56] References Cited

U.S. PATENT DOCUMENTS 4,260,900 4/1981 Matsui et al. .................. 358/213.28

Primary Examiner—David C. Nelms
Assistant Examiner—Stephone B. Allen
Attorney, Agent, or Firm—Fitzpatrick, Cella, Harper & Scinto

[57] ABSTRACT

There is provided a non-linear photoelectric converting apparatus comprising: a photosensing unit for converting a photosignal into a charge signal; a photoelectric converting device consisting of a charge detecting unit to transfer the charges generated in the photosensing unit through the gate and convert them into the voltage signal; and a draining unit for draining the charges temporarily accumulated in the photosensing unit of the photoelectric converting device for an accumulation period, wherein the draining performance of the draining unit is gradually changed for the charge accumulation period.

15 Claims, 12 Drawing Sheets

NON-LINEAR PHOTOELECTRIC CONVERTING APPARATUS WITH MEANS FOR CHANGING DRAINAGE PERFORMANCE

BACKGROUND OF THE INVENTION

1. Field of the Invention

The present invention relates to a non-linear photoelectric converting apparatus in a photoelectric converting device of an accumulation type such as a CCD or the like for converting a photosignal into an electric signal in which the gamma characteristic of the output electric signal for the input photo signal can be set to $\gamma < 1$.

2. Related Background Art

Solid state image pickup devices such as CCD and the like consist of semiconductor and, therefore, have various advantages such that they are small-sized and light-weight, and electric power consumption is small, reliability is high, and the like. Also, these devices sequentially read out signals generated in pixels arranged accurately like a mosaic, so that graphic distortion is very small and the like. For these reasons, such solid state image pickup devices have been used widely in recent years. In most such devices, the gamma characteristic $\gamma$ is nearly equal to 1 and the gradations of the input image and output image are almost equal and excellent linearity is obtained. On the contrary, however, there are the following drawbacks. The dynamic range is narrower than that of the silver salt film. It is difficult to obtain a video signal such that images in the natural world and the like can be reproduced with a high degree of clearness and brightness from high luminance to low luminance. It is likely for the dark portion to be blacked out and the bright portion to be saturated.

In addition, since the dynamic range which can be expressed by the display device is generally narrow, in order to reduce the burden of signal processes, the $\gamma$ conversion such as logarithm conversion or the like needs to be performed in the gamma characteristic and it is necessary to convert the luminance level into the compressed signal and to execute the signal processes. However, even if the processes such as $\gamma$ conversion and the like are performed at the post stage by the CCD or the like, the dynamic range of luminance information of the image signal which is derived from the CCD or the like is narrow, so that the effective advantage cannot be obtained. Therefore, there is the drawback such that in the case of compressing the image signal by the $\gamma$ conversion at the post stage of the image pickup device, an optical image of a relatively wide dynamic range cannot be substantially handled.

SUMMARY OF THE INVENTION

It is an object of the present invention to provide a photoelectric converting apparatus which can eliminate the foregoing drawbacks in the conventional technology.

Another object of the invention is to provide a non-linear photoelectric converting apparatus in which a shift pulse voltage to be applied to a shift gate of a photoelectric converting device of an accumulation type is varied in accordance with the sequence of generation of shift pulses, thereby enabling an optical image signal of a wide dynamic range to be compressed into an electric signal with a good S/N ratio in which $\gamma < 1$.

Still another object of the invention is to provide a non-linear photoelectric converting apparatus in which the potential of a drain gate of a photoelectric converting device of an accumulation type is used as a function of time during an integration period, a desired gamma characteristic is polygonal line approximated, the number of change times of the potential of the drain gate is reduced, thereby enabling the control to be easily performed and also enabling an approximation error to be reduced.

Still another object of the invention is to provide a non-linear photoelectric converting apparatus in which the potential of a drain gate of a photoelectric converting device of an accumulation type is used as a function of time during accumulation period, thereby enabling an optical image signal of a wide dynamic range to be compressed into an electric signal with a good S/N ratio in which $\gamma < 1$.

To accomplish the above objects, a non-linear photoelectric converting apparatus according to an embodiment of the present invention comprises a photo sensing unit for converting a photo signal into an electric signal; draining means for draining the electric signal produced in the photosensing unit from the photo sensing unit; and control means for allowing the photo signal to be converted into the electric signal and accumulated in the photo sensing unit for a predetermined period, and for gradually changing the draining performance of the draining means in this predetermined period.

To attain the above objects, a non-linear photoelectric converting apparatus according to another embodiment of the invention comprises: a photo sensing unit for converting a photo signal into an electric signal; draining means for removing the electric signal of a level above a predetermined level in the electric signal produced in the photo sensing unit from the photo sensing unit; and control means for allowing the photo signal to be converted into the electric signal and accumulated in the photo sensing unit for a predetermined period, and for gradually changing the predetermined signal level in this predetermined period.

According to the non-linear photoelectric converting apparatuses in the above-mentioned embodiments, the input/output characteristics of the photoelectric converting device of the accumulation type can be set to $\gamma < 1$ by a fairly simple circuit constitution, the input photo signal of a wide dynamic range can be compressed and converted into the voltage signal with a good S/N ratio, and by use of this device as an image pickup apparatus, the optical image signal of a wide dynamic range in the natural world and the like can be input (reproduced) without being saturated.

The above and other objects and features of the present invention will become apparent from the following detailed description and the appended claims with reference to the accompanying drawings.

BRIEF DESCRIPTION OF THE DRAWINGS

The drawings show an embodiment of a non-linear photoelectric converting apparauts according to the present invention, in which.

DETAILED DESCRIPTION OF THE PREFERRED EMBODIMENTS

The present invention will now be described in detail with respect to an embodiment shown in the diagrams.

Figure 1:
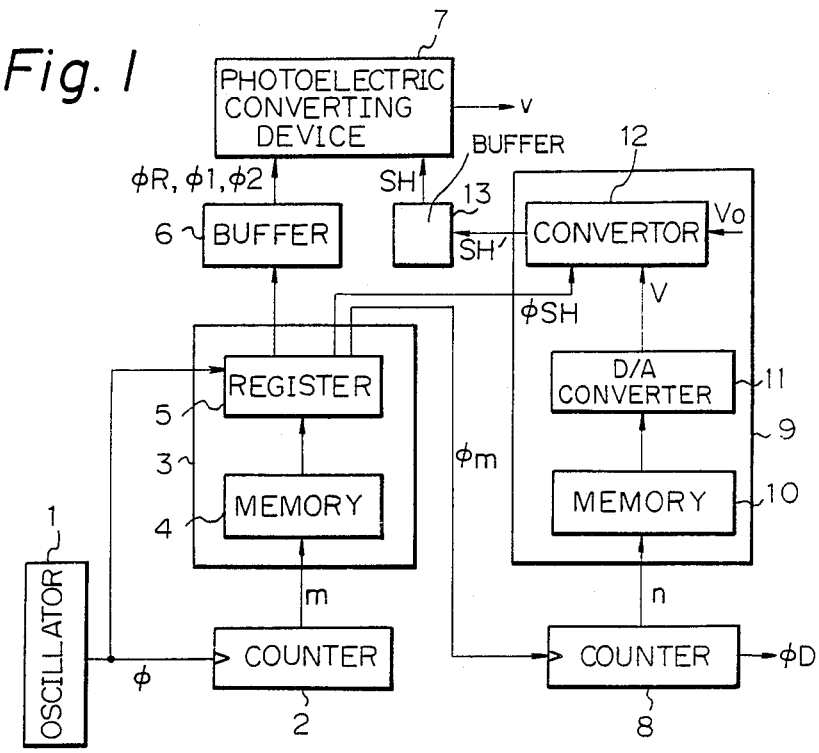
FIG. 1 is an overall arrangement diagram.

FIG. 1 is an overall arrangement diagram, in which a counter 2 is connected to an oscillator 1 and a drive pulse generator 3. The drive pulse generator 3 comprises a semiconductor memory 4 which can be addressed and a register 5. The memory 4 receives a signal from the counter 2. The register 5 is connected to the memory 4 and oscillator 1 and receives signals from the oscillator 1 and memory 4 and outputs them to a buffer 6. The output of the buffer 6 is connected to a photoelectric converting device 7 of an accumulation type such as a CCD or the like. The output of the register 5 is also connected to a counter 8. The output of the counter 8 is connected to a shift pulse modulator 9. The modulator 9 comprises a semiconductor memory 10, a D/A converter 11, and a shift pulse voltage converter 12 which are connected in series. The converter 12 receives the outputs of the register 5 and D/A converter 11 and transmits an output signal to the photoelectric converting device 7 through a buffer 13.

The counter 2 counts a reference clock pulse $\phi$ which is generated from the oscillator 1. The counter 2 is the M-notation counter in which the count value is returned to the initial value when the reference clock pulse $\phi$ is counted M times. The time required to count the pulse $\phi$ M times serves to determine a time interval $T_s$ between pulses $\phi_{SH}$, which will be explained hereinafter. The count output m of the counter 2 serves to provide relative time information with the shift pulse generation time. By inputting the count output m to an address input terminal of the memory 4, this output signal is supplied to the drive pulse generator 3 for generating a drive pulse to drive the photoelectric converting device 7.

Waveform data such as two-phase drive pulses $\phi_1$ and $\phi_2$ corresponding to the address m, a reset pulse $\phi_R$, a shift pulse $\phi_{SH}$, and the like is preliminarily stored in the memory 4. When the output of the counter 2 is m, the data in the address m in the memory 4 is output from a data terminal and written into the register 5 synchronously with the reference clock pulse $\phi$ from the oscillator 1. The drive pulses $\phi_1$ and $\phi_2$ and reset pulse $\phi_R$ written in the register 5 are supplied to the photoelectric converting device 7 through the buffer 6, thereby driving the device 7.

On the other hand, a pulse $\phi_m$ which is output from the register 5 to the counter 8 is the count-up pulse which is generated once for the period of M clocks after the counter 2 was counted up M times until the count value is returned to the initial value. Therefore, the pulse $\phi_m$ is the clock pulse to count up the counter 8. The counter 8 is provided to know which number of shift pulse $\phi_{SH}$ has been generated during the accumulation period of one cycle. A signal n which is output from the counter 8 to the memory 10 indicates the sequence of the shift pulse $\phi_{SH}$. On the other hand, when the counter 8 counts the Nth shift pulse $\phi_{SH}$ (namely, after completion of the readout of the charge signal of one line), a signal $\phi_D$ is output from the counter 8. The signal $\phi_D$ is held at a high ("H") level for the period to read out the data from the photoelectric converting device 7. The count value n indicative of the sequence of the shift pulse $\phi_{SH}$ generated from the counter 8 is input to the shift pulse modulator 9. A modulation voltage V of the shift pulse $\phi_{SH}$ is produced from the count value n representative of the sequence of the pulse $\phi_{SH}$. The shift gate applied voltage is modulated into the voltage V. Namely, the semiconductor memory 10 such as ROM, RAM, EPROM, or the like of the shift pulse modulator 9 receives the sequence n of the shift pulse $\phi_{SH}$ at an address input terminal and outputs a digital value corresponding to the modulation voltage V(n) of the nth shift pulse $\phi_{SH}$ from a data output terminal. The output digital value is converted into the analog voltage by the D/A converter 11 becomes the shift pulse modulation voltage V(n). The shift pulse voltage converter 12 receives the shift pulse modulation voltage V from the D/A converter 11 and also receives a set voltage $V_0$ from the outside. When the shift pulse $\phi_{SH}$ received from the register 5 is at an "H" level, the converter 12 outputs a shift gate applied voltage SH' as V to the buffer 13. On the contrary, when the shift pulse $\phi_{SH}$ is at a low ("L") level, the converter 12 outputs the shift gate applied voltage SH" as $V_0$ to the buffer 13. The buffer 13 temporarily stores the shift gate applied voltage SH' of V or $V_0$ to produce the shift gate signal SH and applies the voltage V or $V_0$ to the shift gate of the photoelectric converting device 7.

Figure 2A:
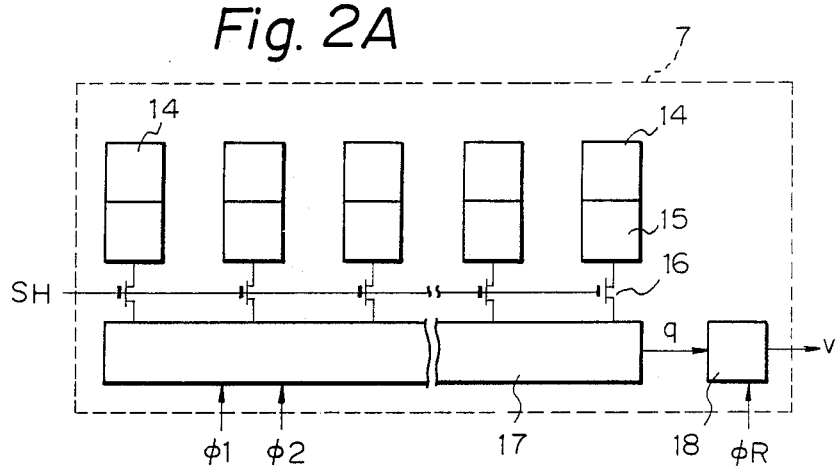
FIG. 2A is an arrangement diagram of the photoelectric converting device of an accumulation type.
Figure 2B:
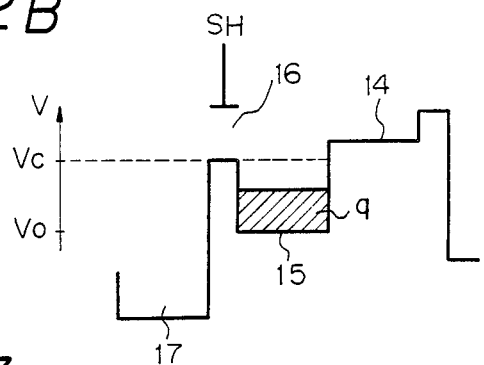
FIG. 2B is an explanatory diagram of the potential well.

FIGS. 2A and 2B are explanatory diagrams of the photoelectric converting device 7 of the accumulation type, in which FIG. 2A is the arrangement diagram of the device 7 and FIG. 2B is an explanatory diagram of the potential well. A plurality of, for example, five photo sensing units 14 each for converting a photo signal into a charge signal are arranged in parallel. The photo sensing units 14 are respectively connected with the same number of accumulating units 15 each for accumulating the charges generated in the photo sensing unit 14. FIG. 2A shows an example of the photoelectric converting device 7 consisting of five pixels in which five sets of photo sensing units 14 and accumulating units 15 are arranged in parallel for convenience of explanation. However, the number of pixels may be properly selected to an arbitrary number in accordance with the purpose. The accumulating units 15 are connected to a multi-stage CCD transfer unit 17 through shift gates 16. The charges accumulated in the accumulating units 15 are transferred to each stage of the transfer unit 17 through the shift gates 16 when the shift gate signal SH is input. The transfer unit 17 constitutes an analog shift register adapted to serially transfer the charges. The transfer unit 17 is driven by the drive pulses $\phi_1$ and $\phi_2$ generated from the register 5 through the buffer 6 and outputs a charge signal q. The charge signal q is input to a charge detecting unit 18. The charge detecting unit 18 is periodically reset by the reset pulse $\phi_R$ received from the register 5 through the buffer 6 and converts the charge signal q into the voltage signal v.

FIG. 2B shows potential states of the photo sensing units 14, accumulating units 15, shift gates 16, and transfer unit 17 of the photoelectric converting device 7, in which V represents a magnitude of a voltage to be applied to the shift gate 16. The potential of the photo sensing unit 14 is higher than $V_c$ and the maximum value of the potential of the accumulating unit 15 is $V_c$ and the minimum value is $V_0$. Since the minimum value of the potential of the transfer unit 17 is set to be lower than $V_0$, when the potential barrier of the shift gate 16 is set to $V_c$, the charge signal q is accumulated into the accumulating unit 15 until the maximum value $V_c$ and the charges exceeding the maximum level $V_c$ are drained into the transfer unit 17. On the other hand, when the potential barrier of the shift gate 16 is set to $V_0$, the charge signal q accumulated in the accumulating unit 15 all flows out into the transfer unit 17.

Figure 3:
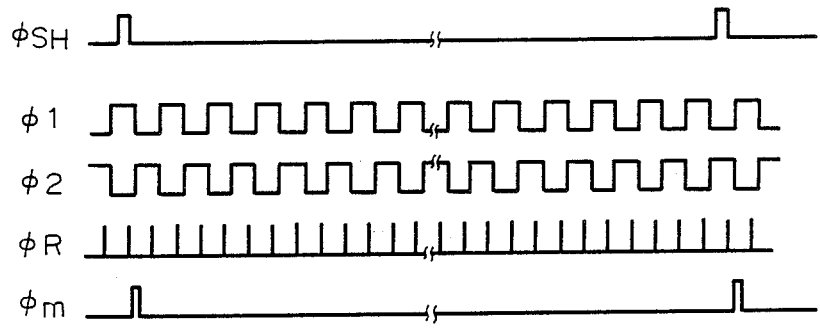
FIG. 3 is a timing chart of drive pulses.

FIG. 3 is a timing chart for pulses. In correspondence to the count output m of the counter 2 for counting the reference clock pulse $\phi$ from the oscillator 1, the drive pulses $\phi_1$ and $\phi_2$ and reset pulse $\phi_R$ written in the memory 4 are output through the register 5 and buffer 6. The charge signal q is output from the transfer unit 17 by the drive pulses $\phi_1$ and $\phi_2$. The charge signal q is converted into the voltage signal v in the charge detecting unit 18 by the reset pulse $\phi_R$. For the period of m clocks after the counter 2 was counted up M times until the count value is returned to the initial value, the count-up pulse $\phi_m$ is output once from the register 5 to the counter 8 and the shift pulse modulator 9 is made operative. Also, the shift pulse $\phi_{SH}$ is output from the register 5 to the shift pulse voltage converter 12 and the shift gate applied voltage SH' is modulated into V or $V_0$.

Figure 4:
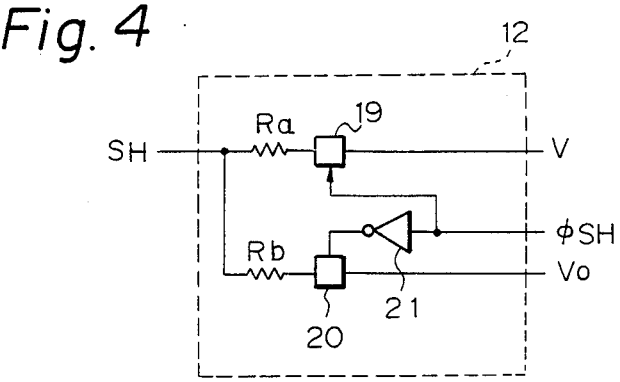
FIG. 4 is an arrangement diagram of a shift pulse voltage converter.

FIG. 4 is an arrangement diagram of the shift pulse voltage converter 12. An analog gate 19 and a resistor $R_a$ are connected in series to the output voltage V of the D/A converter 11. An analog gate 20 and a resistor $R_b$ are connected in series to the external set voltage $V_0$. The resistors $R_a$ and $R_b$ are connected in parallel, thereby allowing the shift gate signal SH' to be output to the buffer 13. Further, the shift pulse $\phi_{SH}$ from the register 5 is connected to a control terminal of the analog gate 19 and is also connected to a control terminal of the analog gate 20 through an inverter 21. When the shift pulse $\phi_{SH}$ is at an "H" level, the analog gate 19 is turned on and the analog gate 20 is turned off by way of the inverter 21. The shift gate applied voltage SH' becomes V. On the contrary, when the shift pulse $\phi_{SH}$ is at an "L" level, the analog gate 19 is turned off and the analog gate 20 is turned on since the signal is transmitted thereto through the inverter 21. The shift gate applied voltage SH' becomes $V_0$. In this manner, the shift gate applied voltage SH' can be switched between $V_0$ and V by the shift pulse $\phi_{SH}$ from the register 5.

Figure 5:
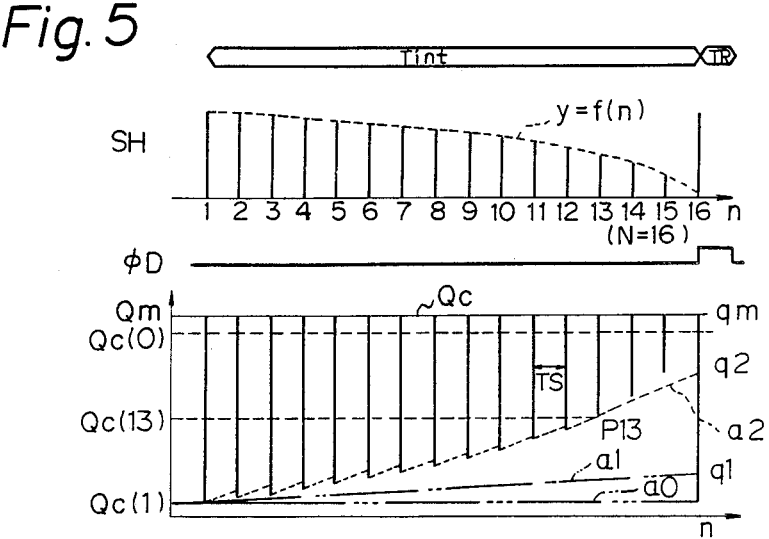
FIG. 5 is a timing chart showing the integration of shift pulses and charges.

FIG. 5 is a timing chart showing a state of the charge integration in the shift pulse $\phi_{SH}$ of the shift gate signal SH and the accumulating unit 15. In this embodiment, although the maximum value N of the number of shift pulses $\phi_{SH}$ which are counted by the counter 8 is set to 16, it may be set to an arbitrary number as necessary. The data which is previously stored into the semiconductor memory 10 of the shift pulse modulator 9 is set on the basis of the following expressions.

Namely, for the address n, it is assumed that $$f(n) = 64 \log_2 (N - n + 1) - 1 \quad (1 \leq n < N)$$
$$f(n) = f(1) \quad (n = N)$$

Table 1 shows the values of f(n) in the case of the address n in which the fractions of 0.5 and over are counted as a unit and the rest is cut away.

TABLE 1

| n | f (n) |
| --- | --- |
| 1 | 255 |
| 2 | 249 |
| 3 | 243 |
| 4 | 236 |
| 5 | 228 |
| 6 | 220 |
| 7 | 212 |
| 8 | 202 |
| 9 | 191 |
| 10 | 179 |
| 11 | 164 |
| 12 | 148 |
| 13 | 127 |
| 14 | 100 |
| 15 | 63 |
| 16 | 255 |

In this manner, by previously storing the values of f(n) into the semiconductor memory 10 for the address n, the shift gate signal SH to be applied to the shift gate 16 becomes the pulse signal as shown in FIG. 5. Namely, for the integration period $T_{int}$ of one cycle, the shift gate signal SH of the magnitude of f(n) which decreases in association with an increase in n is output. When n equals N, the shift gate signal SH is returned to the initial value and the read period TR to read out the integrated charge signal q comes. The pulse signal $\phi_D$ which is output from the counter 8 indicates the read period TR and becomes an "H" level just after the Nth shift pulse $\phi_{SH}$ was output. The pulse signal $\phi_D$ is held at an "H" level during the read period TR and it is returned to an "L" level after completion of the read period TR. The pulse signal $\phi_D$ is kept at an "L" level during the integration period $T_{int}$.

The lower part of FIG. 5 is a graph showing a time-dependent change of the maximum charge quantity $Q_c$ which can be accumulated and which corresponds to the shift gate signal SH in the accumulating unit 15. It will be understood from this graph that the maximum charge quantity also decreases for the period when the pulse of the shift gate signal SH is output. An axis of abscissa in FIG. 5 denotes a time basis. In this embodiment, however, since the time interval $T_s$ between the adjacent shift pulses $\phi_{SH}$ is constant, if $T_s$ is used as a time unit, the sequence of the shift pulses $\phi_{SH}$ will correspond to the time. The axis of abscissa is shown by n similarly to the shift gate signal SH.

When the first shift pulse $\phi_{SH}$ is output, the maximum charge quantity at the time point of each n changes, namely, the charge capacitance $Q_c(1)$ which can be accumulated in each of the accumulating units 15 decreases to $Q_l$. The charge capacitance $Q_c$ pl becomes the maximum charge capacitance $Q_m$ immediately after the shift pulse $\phi_{SH}$ is returned to an "L" level, then the integration is started. At this time, the integration state of the charges corresponding to the intensity of light which is irradiated onto the photosensing units 14 is indicated by an alternate long and short dash line $a_2$. The generated charge quantity per unit time becomes as shown by the gradient $a_2$.

In FIG. 5, assuming that the accumulated charge quantity just before the time point of n is q (n−), the accumulated charge quantity q (13−) and the charge capacitance Q (13) are equal at point $P_{13}$ when n is 13. When n is 1 to 12, the accumulated charge quantities q (1−) to q (12−) exceed the charge capacitances $Q_c(1)$ to $Q_c(12)$, respectively. When n is 14 and 15, the accumulated charge quantities q (14) and q (15) in the accumulating units 15 are smaller than $Q_c(14)$ and $Q_c(15)$, respectively. FIG. 5 shows an example in such a case. Therefore, until n equals 13, each time a shift pulse is generated, the charges q which were additionally integrated than the charge capacitance $Q_c$ in the accumulating unit 15 are transferred to the transfer unit 17 through the shift gate 16 and drained through the transfer unit 17. On the other hand, when n=14 and 15, the charge signal q falls within the charge capacitance $Q_c$, so that it is not drained.

Namely, when $$\Delta Q_c(n) = Q_c(n) - Q_c(n-1)$$

if the following relation is obtained for the generated charge quantity α per unit time $$\Delta Q_c(n) < \alpha < \Delta Q_c(n+1),$$

the charge capacitance $Q_c(n)$ when the shift pulse $\phi_{SH}$ is generated before generation of the nth shift pulse $\phi_{SH}$ will be smaller than the charge quantity q (n−) accumulated until the time point immediately before the nth generation. Therefore, when the nth shift pulse $\phi_{SH}$ is generated, the surplus charges q (n−) − $Q_c(n)$ are transferred to the transfer unit 17 through the shift gate 16 and drained. Thus, the charge quantity in the accumulating unit 15 just after the nth shift pulse $\phi_{SH}$ was generated becomes q (n+) equals $Q_c(n)$. In this case, it is assumed that q (1−) ≧ $Q_c(1)$.

On the other hand, when the nth and the subsequent shift pulses $\phi_{SH}$ are generated, the charge quantity α which is added for the time interval until the next shift pulse $\phi_{SH}$ is generated is smaller than $Q_c(n+1) - Q_c(n)$. Therefore, no charge is drained when the (n+1)th shift pulse $\phi_{SH}$ is generated. The charge quantity q (N−) integrated in the accumulating unit 15 until just before the end time of the integration becomes $q_2$. The charge quantity $(q_2 - Q_1)$ in excess of $Q_1$ is transferred to the transfer unit 17 by the Nth shift pulse $\phi_{SH}$ generated just after that. These charges are sequentially converted into the voltage signal v through the charge detecting unit 18 and read out by the drive pulses $\phi_1$ and $\phi_2$ which are input to the transfer unit 17 during the read period TR after that.

Although it has been set such that $Q_c(N) = Q_1$, the accumulated capacitance $Q_c(N)$ when the Nth shift pulse $\phi_{SH}$ is generated may be set such that $Q_c(N) \leq Q_c(1)$. By setting $Q_c(N) > Q_c(1)$, the substantial integration period is reduced.

In addition, for example, if the intensity of light which is irradiated onto the photo sensing units 14 is insufficient and the charge quantity which will be generated per unit time is small, the integrated charges will become an integration line $a_1$ as shown by an alternate long and two short dashes line. The charge quantity q (n−) is smaller than the charge capacitance $Q_n$ in the accumulating unit 15 with respect to all n. Therefore, the accumulated charges q are linearly output without being reduced at all. In FIG. 5, $a_0$ indicated by an alternate long and three short dashes line denotes an integration line when no light is irradiated onto the photosensing unit 14. In general, the dark current is generated and the charges slightly increase; however, in this case, this phenomenon is ignored since it hardly exerts an influence.

As described above, when the light intensity which is irradiated onto the photo sensing units 14 is strong, the charge quantity α which will be generated per unit time is large, so that a part of charges are reduced by the control of the shift pulse during the charge integration. With an increase in α, the integration line largely rises and the integration line crosses the charge capacitance $Q_c$ until near N, so that the charges are drained until a time point near the time of the end of the integration period and the apparent integration time is reduced. Thus, the ratio of the charges to be reduced for the charges α which are generated per unit time rises with an increase in α. On the contrary, when the light intensity which is irradiated onto the photo sensing unit 14 is weak, the charge quantity α which will be generated per unit time decreases. However, since the crossing between the integration line and the charge quantity $Q_c$ is reduced, the charge will be hardly drained. In addition, there is the case where no charge is drained. As mentioned above, when the generated charge quantity is small, the loss of charges during the integration can be eliminated and a small amount of charges can be effectively collected.

Figure 6:
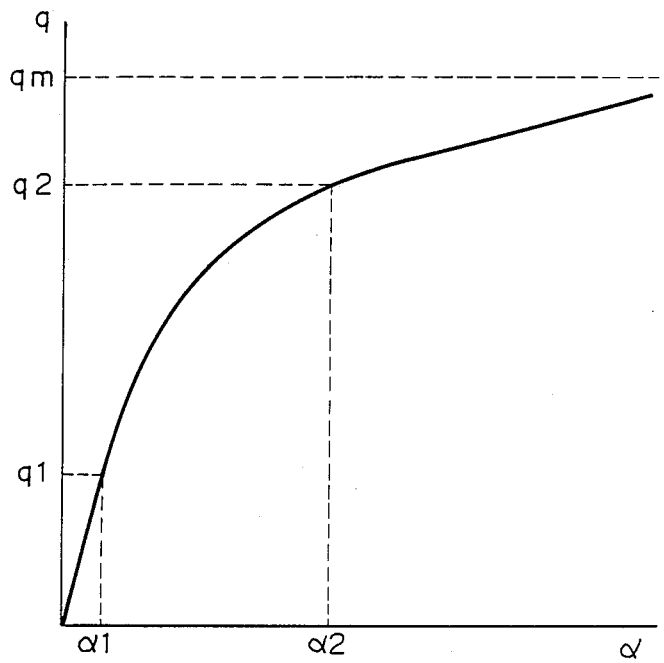
FIG. 6 is an explanatory diagram of photoelectric converting characteristics.

FIG. 6 is a graph showing the substantial photoelectric converting characteristics in the case where f(n) is set to the function shown in Table 1. It will be understood from this graph that the charges q which are transferred to the transfer unit 17 after the integration have the compressed characteristics for the generated charge quantity $\alpha$ per unit time in which $\gamma \leq 1$.

Therefore, in the case where there is the linear relation between $\alpha$ and q as in the conventional apparatus, the charge quantity has already reached the saturation level at the time point when $\alpha$ has almost intermediate value between $\alpha_1$ and $\alpha_2$. However, in the case of the embodiment, it will be understood that the charges q are not saturated even when $\alpha$ has a value which is fairly larger than $\alpha_2$. According to the embodiment, the dynamic range can be widened until $\alpha$ of a value which is nearly four times as large as that in the case of the linear characteristics.

On the other hand, there is the linear relation between the generated charge quantity $\alpha$ per unit time and the intensity I of light which is irradiated onto the photo sensing units 14. There is also the linear relation between the charge quantity q to be transferred and the detection voltage v. Therefore, the detection voltage v has the characteristic of $\gamma \leq 1$ for the light amount which is input to the photoelectric converting device 7. Therefore, the light which is irradiated onto the photo sensing units 14 can be captured in a wide light intensity range.

Although the first embodiment of the invention has been described above, the invention is not limited to only this embodiment. For example, it is also possible to periodically remove the charges from the photoelectric converting device 7 of the accumulation type and to control the charge capacitance so as to be monotonously increased with regard to the time within the accumulation period of the image pickup device. With this method, the charge quantity q accumulated at the time of the end of integration becomes non-linear for the light amount I which enters the photo sensing units 14 so as to satisfy the relation of $\gamma < 1$. Similarly to the first embodiment, the detection voltage V has the compressed characteristic for the light amount I which is irradiated onto the photosensing units 14. Thus, the input dynamic range can be widened.

The second embodiment of the present invention will now be described in detail with reference to the drawings.

Figure 7:
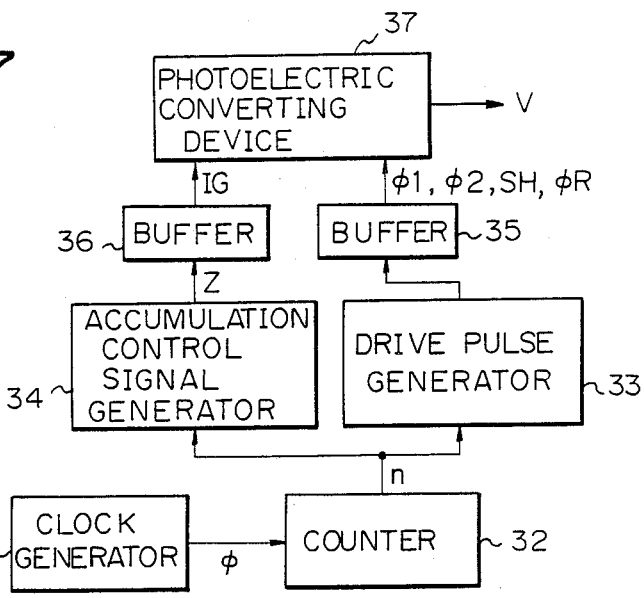
FIG. 7 is an overall arrangement diagram.

FIG. 7 is an overall arrangement diagram. A counter 32 is connected to a clock generator 31 for generating a reference clock pulse $\phi$. A drive pulse generator 33 and an accumulation control signal generator 34 are connected in parallel with the counter 32. The output of the generator 33 is connected to a photoelectric converting device 37 of an accumulation type through a buffer 35. The output of the generator 34 is connected to the photoelectric converting device 37 through a buffer 34. These outputs of the generators 33 and 34 are connected in parallel with the converting device 37.

In order to derive the time information from the reference clock pulse $\phi$ which is generated from the clock generator 31, the counter 32 frequency divides the pulse $\phi$ and outputs the signal n corresponding to the count value to the drive pulse generator 33 and accumulation control signal generator 34. The drive pulse generator 33 supplies the drive pulses $\phi_1$ and $\phi_2$ regarding the change transfer to drive the photoelectric converting device 37, shift pulse SH concerned with the charge transfer, and reset pulse $\phi_R$ with respect to the charge detection to the photoelectric converting device 37 through the buffer 35 in response to the signal n. The accumulation control signal generator 34 receives the signal n and outputs an accumulation control voltage Z to control the drain gate of the photoelectric converting device 37 in response to the signal n. When the accumulation control voltage Z is applied to the buffer 36, the buffer 36 temporarily stores it and outputs as an accumulation control signal IG to the photoelectric converting device 37, thereby controlling the potential of the drain gate of the converting device 37. By controlling the potential of the drain gate in this manner, the charge capacitance which determines the maximum charge quantity which can be accumulated into the accumulating units of the photoelectric converting device 37 is controlled.

Figure 8:
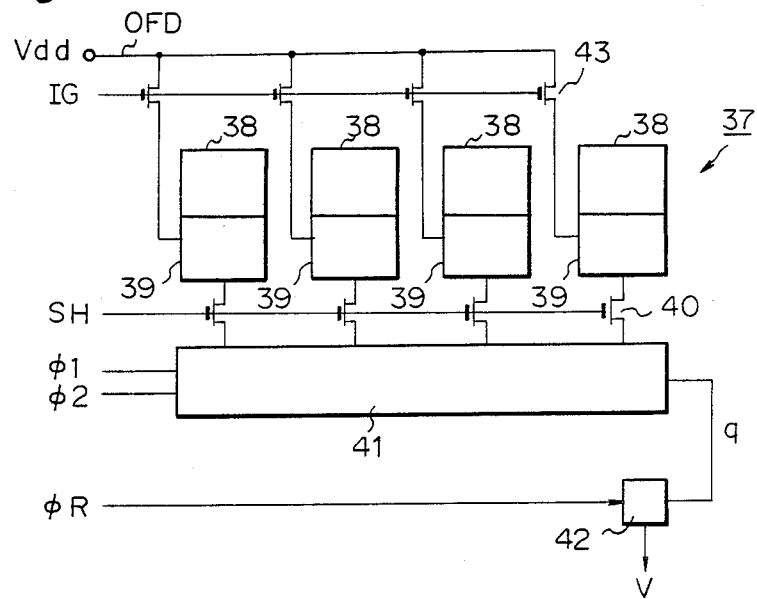
FIG. 8 is an arrangement diagram of the photoelectric converting device of the accumulation type.

FIG. 8 is an arrangement diagram of the photoelectric converting device 37 of the accumulation type. Four photosensing units 38 each for converting the input photo signal into the charge signal are arranged in parallel. The same number of accumulating units 39 each for temporarily storing the charges generated in the photo sensing units 38 are connected thereto, respectively. Although FIG. 8 shows an example of the photoelectric converting device 37 of four pixels consisting of the four photo sensing units 38 and four accumulating units 39, the number of pixels may be set to an arbitrary value in accordance with the object. The accumulating units 39 are connected to a transfer unit 41 through shift gates 40. The output of the transfer unit 41 is connected to a detecting unit 42. Further, the respective accumulating units 39 are connected to a drain OFD through drain gates 43.

The charges generated by the light irradiated onto the photo sensing units 38 are accumulated in the potential wells of the accumulating units 39. The accumulation control signal IG is transmitted from the accumulation control signal generator 34 through the buffer 36 to the drain gate 43 corresponding to the height of barrier of the potential well. By controlling the control signal IG, the height of potential of the drain gate 43 can be changed, thereby controlling the maximum charge quantity which can be accumulated into the accumulating unit 39. The charges of the quantitY in excess of the height of the potential barrier of the drain gate 43 are not accumulated into the accumulating unit 39 but overflow the drain gate 43 and are drained to the drain OFD having the voltage of $V_{dd}$. The charges accumulated in the accumulating units 39 as transferred in parallel to the transfer unit 41 through the shift gate 40 by the shift pulse SH which is input from the drive pulse generator 33 to the shift gate 40 through the buffer 35. On the other hand, in response to two-phase charge transfer pulses $\phi_1$ and $\phi_2$ which are input from the drive pulse generator 33 to the transfer unit 41 through the buffer 35, the charge signal q is time-sequentially transferred to the charge detecting unit 42 and converted into the voltage signal v. Further, the charge signal q is reset by the reset pulse $\phi_R$ which is input from the drive pulse generator 33 to the charge detecting unit 42 thorugh the buffer 35.

Figure 9:
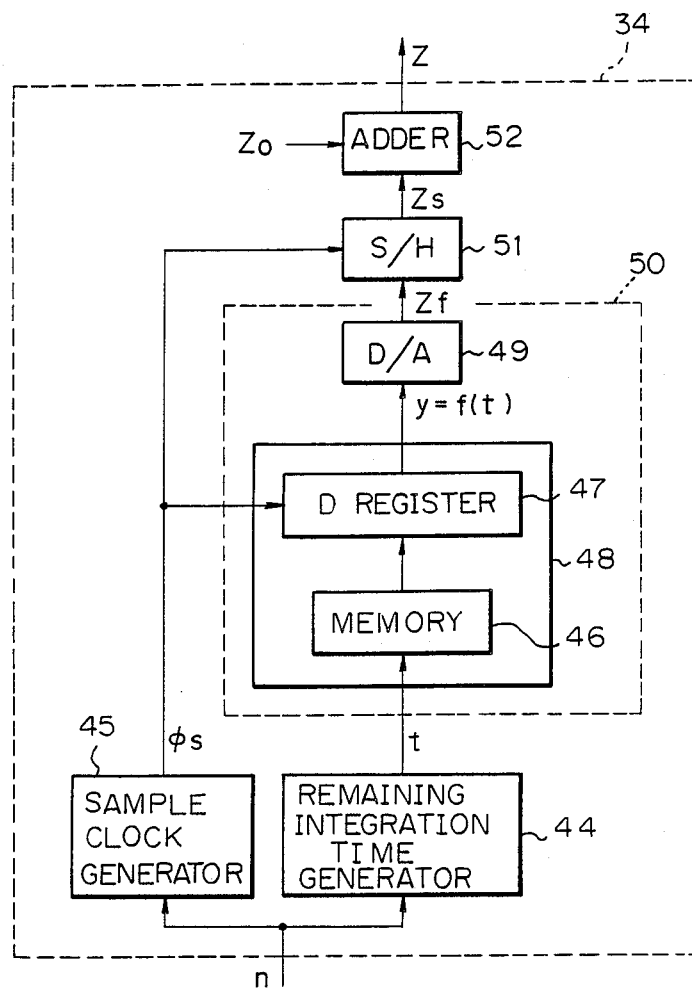
FIG. 9 is an arrangement diagram of an accumulation control signal generator including the first embodiment of a function voltage generator.

FIG. 9 is an arrangement diagram of the accumulation control signal generator 34. The generator 34 has a remaining integration time generator 44 and a sample clock generator 45 each for receiving the count number n which is generated from the counter 32. The output of the remaining integration time generator 44 is connected to a function generator 48 consisting of a semiconductor memory 46 and a D register 47 arranged in series and further connected to a D/A converter 49. A function voltage generator 50 is constituted by the function generator 48 and D/A converter 49. The output of the generator 50 is sequentially connected to a sample and hold (S/H) circuit 51 and an adder 52. The adder 52 is connected to an output terminal of the accumulation control signal generator 34. The output of the sample clock generator 45 is supplied to the D register 47 and S/H circuit 51.

The time generator 44 receives the count value n generated from the counter 32 and generates the remaining integration time t of the charge integration of the photoelectric converting device 37. The content $y = f(t)$ of the data in the address t is previously stored in the semiconductor memory 46 consisting of RAM, ROM, EPROM, or the like, wherein t and f(t) denote numbers which are expressed as the binary format. The remaining integration time t is input to an address input terminal of the memory 46. A binary signal is output from a data terminal. The binary signal at the remaining integration time t is written into the D register 47 synchronously with the leading edge of the sample clock pulse $\phi_s$ which is supplied from the sample clock generator 45.

In this manner, the function generator 48 generates the binary signal f(t) to control the relative voltage of the drain gate 43 by the function f from the remaining integration time t. The binary signal f(t) is converted from the digital value y into the function voltage $Z_f$ of the analog value by the D/A converter 49. Thus, the function voltage generator 50 generates the function voltage $Z_f$ having a relative magnitude of the voltage to be applied to the drain gate 43 in correspondence to the remaining integration time t. The function voltage $Z_f$ is input to the S/H circuit 51. The S/H circuit 51 receives the sample clock pulse $\phi_s$ from the sample clock generator 45. When the clock pulse $\phi_s$ is at a low level, the S/H circuit 51 samples the function voltage $Z_f$. When the clock pulse $\phi_s$ is at a high level, the S/H circuit 51 holds the sampled signal voltage and applies the sampled-and-held function voltage $Z_s$ to the adder 52. The adder 52 adds the function voltage $Z_s$ and a proper bias voltage $Z_0$ which is transmitted from the outside and outputs the voltage Z to the buffer 36.

As mentioned above, the accumulation control signal gnerator 34 generates the remaining integration time t from the count value n of the clock pulse $\phi$ which is generated from the counter 32, performs the function conversion of $y = f(t)$ for the time t, D/A converts y into the function voltage $Z_f$ as the analog signal, and outputs the voltage Z to the buffer 36 by being applied with a bias voltage $Z_0$ from the outside. By applying the accumulation control signal IG from the buffer 36 to the drain gate 43 and by draining the surplus charges from the accumulating units 39 to the drain OFD, the non-linear charge accumulation is executed.

Figure 10:
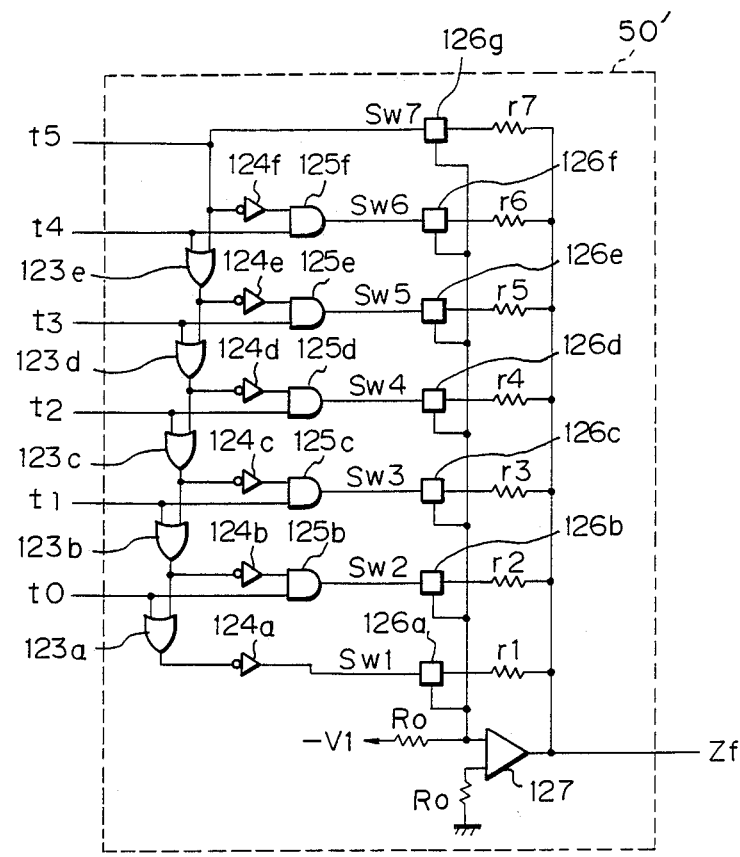
FIG. 10 is an arrangement diagram of the second embodiment of a function voltage generator.

FIG. 10 shows a function voltage generator 50' in another embodiment of the function voltage generator 50. Similarly to the foregoing function voltage generator 50, the generator 50' generates the function voltage $Z_f = f(t)$ which is necessary to generate the voltage IG to be applied to the drain gate 43 from the remaining integration time t. However, the generator 50' converts the function voltage $Z_f$ to voltage level of seven stages. The remaining integration time t in the case of six bit or less has been shown for simplicity and t has a value which satisfies the relation of $0 \leq t < 63$ and is expressed as follows.

$$t = \sum_{k=0}^{5} t_k \cdot 2^k$$

where, $t_0$ to $t_5$ denote signals of each bit of one lower digit to six lower digits of the remaining integration time t and are "1" or "0", respectively.

$t_1$ to $t_4$ are respectively input to OR gates 123b to 123e. The outputs of the OR gates 123b to 123e are sequentially connected to inverters 124b to 124e, AND gates 125b to 125e, analog gates 126b to 126e, and resistors $r_2$ to $r_5$, respectively. $t_0$ is input to an OR gate 123a and an AND gate 125b. The output of the OR gate 123a is sequentially connected to an inverter 124a an analog gate 126a, and a resistor $r_1$. $T_5$ is connected to the OR gate 123e, an inverter 124f, and an analog gate 126g. The output of the inverter 124f is sequentially connected to an AND gate 125f, an analog gate 126f, and a resistor $r_6$. The output of the analog gate 126g is connected to a resistor $r_7$. Further, $t_1$ is input to the AND gate 125c, $t_2$ is input to the AND gate 125d, $t_3$ is input to the AND gate 125e, and $t_4$ is input to the AND gate 125f, respectively. The output of the OR gate 123e is connected to the OR gate 123d, the output of the OR gate 123d is connected to the OR gate 123c, the output of the OR gate 123c is connected to the OR gate 123b, and the output of the OR gate 123b is connected to the OR gate 123a, respectively. The outputs of the analog gates 126a to 126g are connected to an input terminal of an operational amplifier 127. A constant voltage source of $-V_1$ is also connected through a resistor $R_0$ to this input terminal of the operational amplifier 127. The other input terminal of the operational amplifier 127 is grounded through the resistor $R_0$. The end portions of the resistors $r_1$ to $r_7$ are connected to an output terminal of the operational amplifier 127. The resistors which satisfy the expression of $r_k = r_1/k$ (k=1 to 6) are arranged as the resistors $r_1$ to $r_6$.

Switching signals $SW_1$ to $SW_7$ which are supplied to the analog gates 126a to 126g will now be described. Only $t_5$ is supplied as the switching signal $SW_7$ to the analog gate 126g, so that $SW_7$ equals $t_5$. $t_4$ is input to the AND gate 125f and $t_5$ is also input thereto through the inverter 124f and the output of the AND gate 124f is transmitted to the analog gate 126f, so that $SW_6 = t_5^* \cdot t_4$. In this case, it is assumed that $t_5^*$ denotes the negative value of $t_5$. On the other hand, $t_3$ is input to the AND gate 125e and the negative value of $t_5$ and $t_4$ which are obtained through the OR gate 123e and inverter 124e is also input to the AND gate 125e. The output of the AND gate 125e is supplied as the switching signal $SW_5$ to the analog gate 126e. Thus, $SW_5 = (t_5 + t_4)^* \cdot t_3 = t_5^* \cdot t_4^* \cdot t_3$. The switching signals $SW_4$ to $SW_2$ are also derived in a similar manner. With regard to the switching signal $SW_1$, $t_0$ is input through the OR gate 123a and inverter 124a, so that $SW_1 = t_5^* \cdot t_4^* \cdot t_3^* \cdot t_2^* \cdot t_1 \cdot t_0$. When $t = 0$, $$t = \sum_{k=0}^{5} t_k \cdot 2^k$$

Therefore, $t_0$ to $t_5 = 0$, so that $SW_1 = t_5^* \cdot t_4^* \cdot t_3^* \cdot t_2^* \cdot t_1^* \cdot t_0^* = 1$ and the switching signals $SW_2$ to $SW_7$ become 0. When $t = 1$, $$t = \Sigma t_k \cdot 2^k$$

Therefore, $t_0=1$ and $t_1$ to $t_5=0$, so that $SW_2=1$ and the other switching signals become 0. When $t=2$, $t_1=1$, $t_0=0$, and $t_2$ to $t_5=0$, so that $SW_3=$and the other switching signals become 0. When $t=3$, $t_1=1$, $t_0=0$, and $t_2$ to $t_5=0$, so that $SW_3=1$ and the other signals become 0. In the other cases, the values of the switching signals can be also obtained in a similar manner. The logical expressions of the switching signals $SW_1$ to $SW_7$ and the value of t will be as shown below.

$$SW_7 = t_5 \ (t \geq 32)$$

$$SW_6 = t_5{}^* \cdot t_4 \ (t = 16 \sim 31)$$

$$SW_5 = \{t_5 + T_4\}^* \cdot t_3$$
$$= t_5{}^* \cdot t_4 \cdot t_3 \ (t = 8 \sim 15)$$

$$SW_4 = t_5 + t_4 + t_3{}^* \cdot t_2$$
$$= t_5{}^* \cdot t_4{}^* \cdot t_3{}^* \ t_2 \ (t = 4 \sim 7)$$

$$SW_3 = (t_5 + t_4 + t_3 + t_2)^* \cdot t_1$$
$$= t_5{}^* \cdot t_4{}^* \cdot t_3{}^* \ t_2{}^* \cdot t_1 \ (t = 2, 3)$$

$$SW_2 = (t_5 + t_4 + t_3 + t_2 + t_1)^* \cdot t_0$$
$$= t_5{}^* \cdot t_4{}^* \cdot t_3{}^* \ t_2{}^* \cdot t_1{}^* \cdot t_0 \ (t = 1)$$

$$SW_1 = (t_5 + t_4 + t_3 + t_2 + t_1 + t_0)^*$$
$$= t_5{}^* \cdot t_4{}^* \cdot t_3{}^* \ t_2{}^* \cdot t_1{}^* \cdot t_0{}^* \ (1 = 0)$$

As described above, $t_0$ to $t_5$ have the values of "1" or "0". Therefore, by substituting them for the logical expressions of the switching signals $SW_1$ to $SW_7$, the values of $SW_1$ to $SW_7$ alternately become "1" in correspondence to the value of t and either one of the switching signals $SW_1$ to $SW_7$ always becomes "1" and the other switching signals become "0". Now, assuming that the switching signal $SW_k$ is "1", the resistor $r_k$ is selected and the amplification factor of the operational amplifier 127 becomes $(-k/R_0)$ therefore, the function voltage of $Z_f = (r_k/R_0)V_1$ is generated from the function voltage generator 50'.

Figure 11:
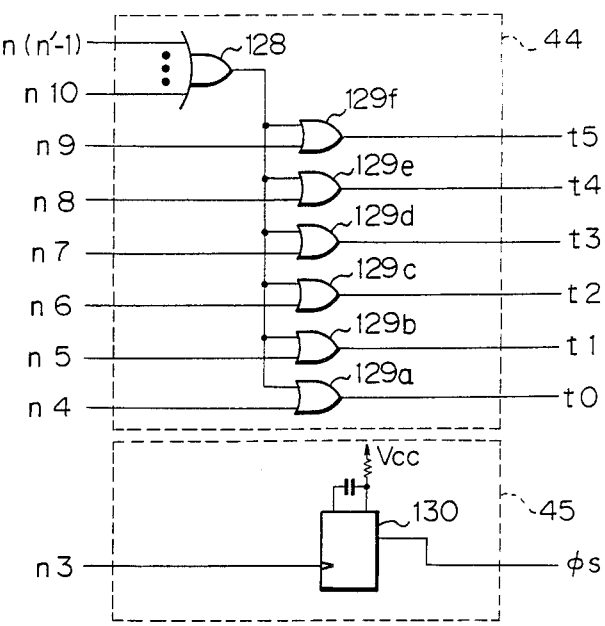
FIG. 11 is an arrangement diagram of a remaining integration time generator and a sample clock generator.

FIG. 11 is an arrangement diagram of the remaining integration time generator 44 to generate the remaining integration time t from the count value n as te output of the counter 32 and of the sample clock generator 45 to generate the sample clock pulse $\phi_s$. When n' assumes the number of bits of the count value n, the count value n can be expressed as follows.

$$n = \sum_{k=0}^{5} n_k \cdot s^k$$

As mentioned above, t can be expressed as follows.

$$t = \sum_{k=0}^{5} t_k \cdot 2^k$$

Although the count values $n_4$ to $n_{(n'-1)}$ are supplied to the remaining integration time generator 44, $n_{10}$ to $n_{(n'-1)}$ are input to an OR gate 128. The OR gate 128 calculates OR of the respective bits of $n_{10}$ to $n_{(n'-1)}$ and outputs $X_{0V} = n_{10} + n_{11} + \ldots + n_{(n'-1)}$. The count values $n_4$ to $n_9$ are input to OR gates 129a to 129f, respectively. $X_{0v}$ is also input to the OR gates 129a to 129f, respectively. Therefore, OR of $n_k$ ($k=4$ to 9) and $X_{0v}$ is calculated and $t_0$ to $t_5$ are output.

In this case, when the output $X_{0v}$ of the OR gate 128 becomes 1, all of the outputs of the OR gates 129a to 129f become 1 and all of $t_0$ to $t_5$ also become 1. Therefore, when $n \geq 2^{10}$, either of the terms above $n_{10}$ certainly becomes 1, so that $t_0$ to $t_5$ become 1 and $t = 1 + 2 + 2^2 + \ldots + 2^5$. Thus, $t = 2^6 - 1$. When $n < 2^{10}$, the terms above $n_{10}$ are 0 in the expression of n. Therefore, each from $n_0$ to $n_9$ have either "0" or "1" and $t_0$ to $t_5$ are equal to the values of $n_4$ to $n_9$. If $n_4 = 1$, $t_0 = 1$, and if $n_5 = 1$, $t_1 = 1$, and the like. Therefore, $$t_k = n_{(k+4)} \ (k = 0 \text{ to } 5)$$

and $$t = \sum_{k=0}^{5} n_{(k+4)} \cdot 2^k$$

Thus, we have $$t = \sum_{k=0}^{5} \{n_{(k+4)} \cdot 2^{(k+4)}\}/2^4$$

Since t has a value of integer, $t = [n/16]$. [ ] is a Gaussian symbol.

On the other hand, in the sample clock generator 45, the count value $n_3$ is input to a trigger input terminal of a multivibrator 130 which is applied with a power source voltage Vcc. The multivibrator 130 is triggered by the leading edge of $n_3$ and a pulse of a proper width is output from an output terminal Q. In this case, since n repetitively rises, the continuous sample clock pulses $\phi_s$ are also generated.

Figure 12A:
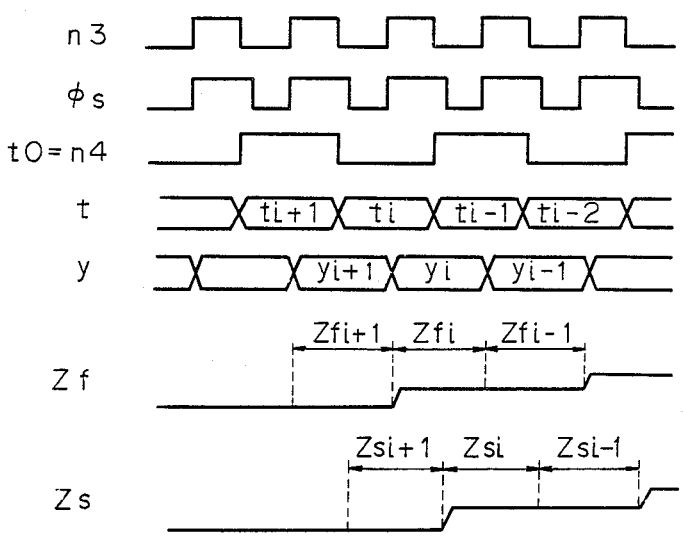
FIG. 12A is a timing chart applicable in the case of using the first embodiment of the function voltage generator.
Figure 12B:
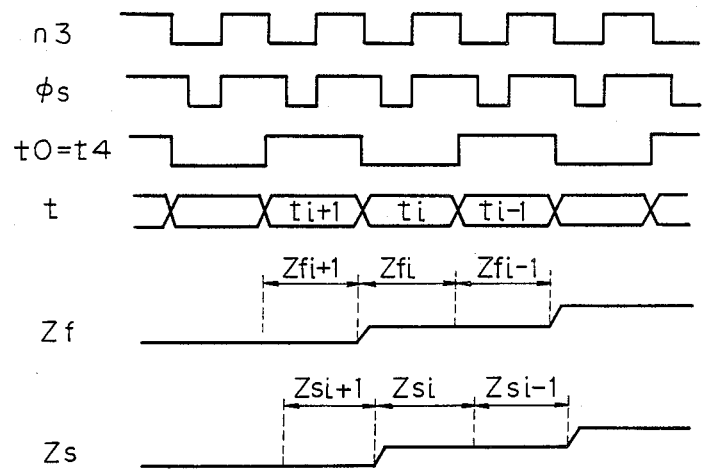
FIG. 12B is a timing chart applicable in the case of using the second embodiment of the function voltage generator.

FIGS. 12A and 12B are timing charts of each signal in the case where the remaining integration time generator 44 and sample clock generator 45 have structures as shown in FIG. 11. FIG. 12A shows the timing chart in the case of using the function voltage generator 50 shown in FIG. 9. FIG. 12B shows the timing chart in the case of using the function voltage generator 50' shown in FIG. 10.

In FIG. 12A, when the sample clock generator 45 receives the count output $n_3$ of the counter 32, the generator 45 outputs the clock pulses $\phi_s$ corresponding to $n_3$. When the remaining integration time generator 44 receives the count output $n_4$ of the counter 32, the generator 44 outputs the remaining integration time t corresponding to the pulse signal of $t_0 = n_4$. When the function generator 48 receives the remaining integration time t, the generator 48 generates the function y from the D register 47 synchronously with the sample clock pulse $\phi_s$. Thus, the function y is generated later than the time t. The function y is output as the function voltage $Z_f$ by the D/A converter 49 and generated as $Z_s$ from the S/H circuit 51 synchronously with the sample clock pulse $\phi_s$. As described above, in the case of using the function voltage generator 50, $Z_s$ is output with the delay time of one unit time with respect to t, thereby allowing the data to be written into the semiconductor memory 46 of the function generator 48 by shifting the data by one address.

In the case of FIG. 12B, since the function voltage $Z_f$ is directly generated from t by the function voltage generator 50', the function voltage $Z_f$ is output in correspondence to t and $Z_s$ is output synchronously with the sample clock pulse $\phi_s$. $Z_s$ is output at a timing which is slightly deviated from the function voltage $Z_f$.

Figure 13:
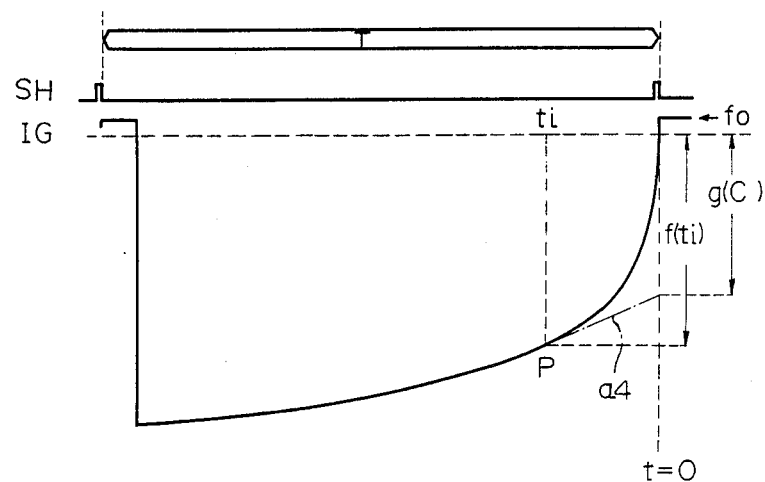
FIG. 13 is an explanatory diagram of a charge accumulation control signal which presents the logarithm converting characteristics.
Figure 14:
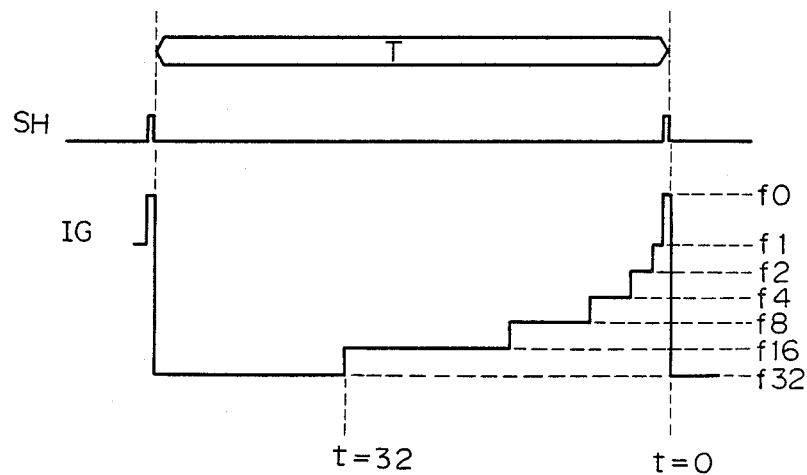
FIG. 14 is an explanatory diagram of a steplike charge accumulation control signal which presents the logarithm converting characteristics of the polygonal line approximation.
Figure 15:
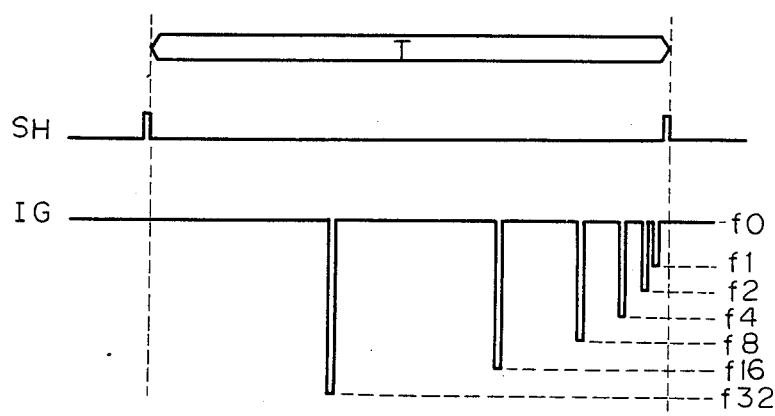
FIG. 15 is an explanatory diagram of a pulselike charge accumulation control signal which presents the logarithm converting characteristics of the polygonal line approximation.

FIGS. 13 to 15 show embodiments of the accumulation control signal IG to be applied to the drain gates 13 from the output $Z_s$ derived as described above. FIG. 13 shows the control signal IG which presents the continous logarithm converting characterisitc, FIGS. 14 and 15 show the accumulation control signals IG which present the logarithm converting characteristic of the polygonal line approximation. A pair of shift pulses SH are generated during one cycle of an accumulation cycle T. For the accumulation control signal IG in this interval, by use of the function voltage generator 50 shown in FIG. 9, various kinds of control functions can be generated by setting the data into the memory 46. The accumulation control signal IG shown in FIG. 13 is obtained by setting the following data into the address x in the memory 46.

$$\begin{cases} f(x) = \alpha_1 \log_x + \beta_1 & (1 \leq x \leq x_{max}) \\ f(x) = f_0 & (x = 0, x_{max} < x) \end{cases}$$

Therefore, when a photo signal of a certain brightness enters the photo sensing units 38 and the charges such as to increase with a gradient C shown by an alternate long and short dash line $a_4$, namely, the charges such that the generated charge quantity per unit time is C are generated in the photo sensing units 38 and flow into the accumulating units 39, the remaining integration time t is longer than $t_i$ on the left side than point P as the contact point of the straight line of the gradient C and the curve of the accumulating control signal IG. In this case, the charge generating speed is larger than the increasing rate of the potential of the drain gates 43, so that the charges as much as the surplus flow out to the drain OFD. Thus, the accumulating units 39 are always filled with the charges. When the remaining integration time t is shorter than $t_i$ after point P, the increasing rate of the potential of the drain gates 43 is larger than the charge generating speed C, so that the charge generated in the photo sensing units 38 are accumulated with the gradient C without overflowing from the accumulating units 39. The charge quantity to be read out by the shift pulse SH which is generated at $t=0$ is the value corresponding to g(C) and the charge quantity $g(C)=\alpha_2 \log_C + \beta_2$.

As shown in FIG. 13, by properly setting the data into the memory 46 using the function voltage generator 50, a desired gamma characteristic can be obtained, but the voltage needs to be finely controlled. However, in dependence on a desired accuracy, there is also the case where there is no need to carefully control the voltage.

FIGS. 14 and 15 illustrate embodiments of the accumulation control signals IG which are constituted in consideration of such a point. Namely, in these embodiments of the accumulation control signal IG, the voltage control is not so troublesome and an approximation error is small. FIG. 14 shows the step-like accumulation control signal IG. FIG. 15 shows the pulse-like accumulation control signal IG. Both FIGS. 14 and 15 use the accumulation control signals IG of which the number of voltage levels is smaller than that of the accumulation control signal IG shown in FIG. 13. $f_0$ to $f_{32}$ denote voltages of the accumulation control signal IG at each remaining integration time t. In the case of FIG. 14, since the signal IG is the step-like signal, the charge quantity g(C) to be read out is obtained as the polygonal line approximation of the logarithm compression of C.

FIG. 15 is a modified form of the accumulation control signal IG shown in FIG. 14. Only when $t=1, 2, 4, 8, 16$, and 32, the voltage of the signal IG is set to $f_1, f_2, F_4, f_8, f_{16}$, and $f_{32}$. The voltage of signal IG is set to $f_0$ at the other times. In this case, the converting characteristic of g(C) for the charge quantity C which is generated for unit time is also similar to that in the case of FIG. 14. Although the accumulation control signals IG shown in FIGS. 14 and 15 can be obviously produced by the function voltage generator 50, they can be also easily produced by the function voltage generator 50'.

Figure 16A:
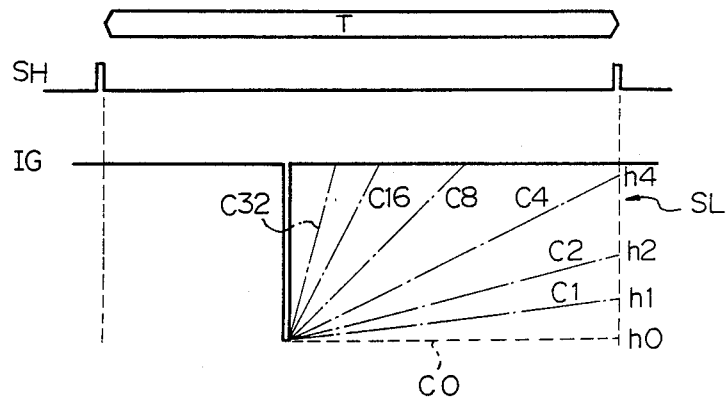
FIG. 16A is an explanatory diagram of the charge integration in the case of generating only a single charge accumulation control signal in a conventional example.
Figure 16B:
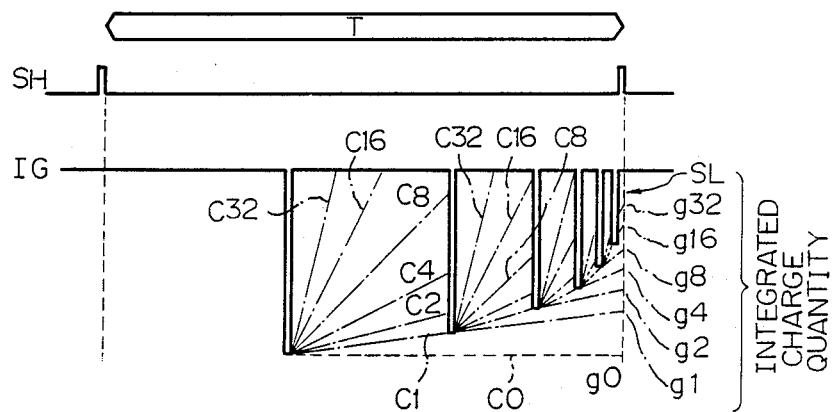
FIG. 16B is an explanatory diagram of the charge integration in the case of generating a charge accumulation control signal of the levels of six stages in an embodiment according to the present invention.

FIGS. 16A and 16B show states in which the charges are accumulated into the accumulating units 39 in response to the accumulation control signals IG. FIG. 16A shows the state for the accumulation control signal IG in the conventional apparatus. FIG. 16B shows the state for the accumulation control signal IG shown in FIG. 15. In FIG. 16A, one pulse is output during one integration cycle T. The output v is set to a v=hi for the charge quantity $C_i$ which is generated for a unit time and there is the linear relation between C and v so long as they are not saturated. $C_0$ denotes an integration line showing the state of integration in the case where no light enters the photo sensing units 38. Similarly, $C_1$ is an integration line in the case where a certain constant light enters the photo sensing units 38. $C_2$ denotes an integration line in the case where the light which is twice as large as $C_1$ enters; $C_4$ is an integration line in the case where the light which is four times as large as $C_1$ enters; $C_8$ an integration line in the case where the light which is eight times as large as $C_1$ enters; and $C_{16}$ an integration line in the case where the light which is sixteen times as large as $C_1$ enters, respectively. It will be understood that in the case of FIG. 16A, the charge quantity reaches the saturation level SL by the light of $C_4$.

On the other hand, in the case of FIG. 16B, pulses of the levels of six stages are output during one integration cycle T. When $t=0$, the accumulating units 39 are not saturated even for the light of $C_{32}$ but output the voltage of $v=g_{32}$.

Figure 17:
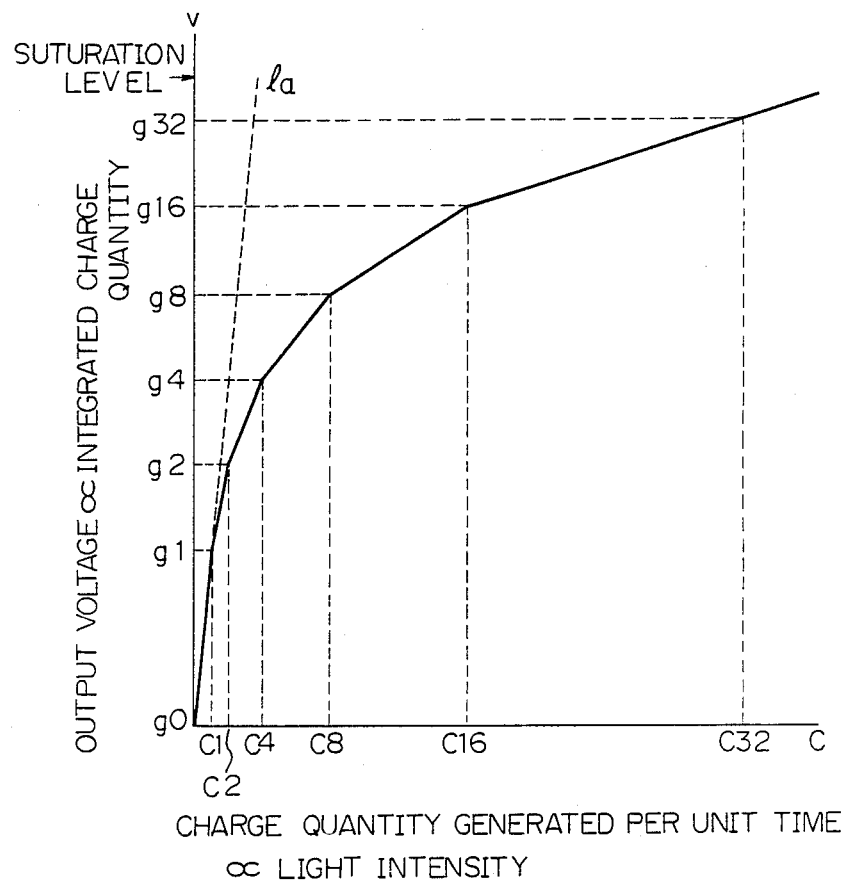
FIG. 17 is an explanatory diagram of the converting characteristics between the generated charge quantity and the output voltage.

FIG. 17 shows the characteristic of $C_i$ and $g_i$ shown in FIG. 16B as mentioned above, namely, the converting characteristic between the generated charge quantity C per unit time indicative of the input photo signal and the voltage output signal $v=g(C)$. $v=g(C)$ is the polygonal line approximately of the logarithm characteristic. A broken line $l_a$ shown in FIG. 17 represents the characteristic between $C_i$ and $g_i$ in the case of FIG. 16A. It will be appreciated that the input signal having the wide dynamic range which is about ten times as wide as that in FIG. 16A can be logarithm compressed. Even if the photoelectric conversion is embodied with regard to the accumulation control signal IG shown in FIG. 14, almost similar effect can be obtained. With respect to the accumulation control signal IG shown in FIG. 13 as well, the polygonal line approximation is not performed but the continuous approximation is executed. However, it is obviously understood that the input photo signal having a wide dynamic range can be also similarly logarithm compressed.

Figure 18A:
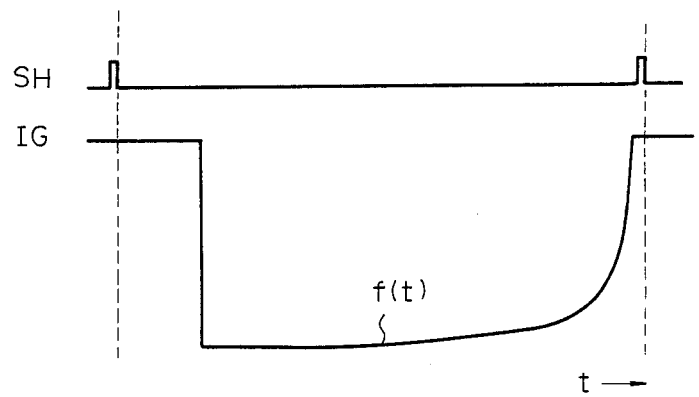
FIG. 18A is an explanatory diagram of another embodiment of a charge accumulation control signal.
Figure 18B:
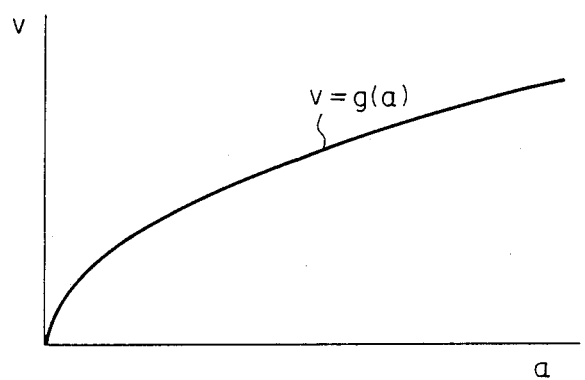
FIG. 18B is an explanatory diagram of the converting characteristics between the generated charge quantity and the output voltage in the case of using the charge accumulation control signal.

FIGS. 18A and 18B show other embodiments of the accumulation control signal IG and illustrate the case of the converting characteristic of $\gamma=0.5$. FIG. 18A shows the accumulation control signal IG in the case where the data of $f(x)=\alpha_3/x+\beta_3$ is set into the address x in the semiconductor memory 46. FIG. 18B shows the converting characteristic between the charge quantity C which is generated per unit time and the output voltage $v = g(C)$ in the case of using the accumulation control signal IG shown in FIG. 18A. In this case, $g(C) = \alpha_4 \cdot C^{\frac{1}{2}} = \beta_4$ and the wide dynamic range can be also derived in a manner similar to the case of FIG. 17.

What is claimed is:

1. A non-linear photoelectirc converting apparatus comprising;
   (a) a photosensing unit for converting a photo signal into an electric signal;
   (b) draining means for draining the electric signal produced in said photo sensing unit from the photo sensing unit; and
   (c) control means for allowing the photo signal to be converted into the electric signal and accumulated in the photo sensing unit for a predetermined period, and for gradually changing a draining performance of said draining means within said predetermined period.

2. An apparatus according to claim 1, wherein said draining means includes a drain to drain the electric signal in said photo sensing unit.

3. An apparatus according to claim 1, wherein said control means gradually reduces the draining performance of said draining means within said predetermined period.

4. An apparatus according to claim 1, further including readout means for reading out the electric signal in said photo sensing unit.

5. An apparatus according to claim 2, wherein said draining means includes gate means arranged between said drain and said photo sensing unit.

6. An apparatus according to claim 5, wherein said control means controls a potential level of said gate means.

7. An apparatus according to claim 3, wherein said control means continuously changes the potential level of said gate means within said predetermined period.

8. An apparatus according to claim 3, wherein said control means intermittently changes the potential level of said gate means a plurality of times within said predetermined period.

9. An apparatus according to claim 4, wherein said draining means reads out the electric signal in said photo sensing unit through said readout means a plurality of times within said predetermined period, thereby draining the electric signal.

10. An apparatus according to claim 9, wherein said readout means has:
    an output amplifier for outputting the electric signal of said photo sensing unit; and
    gate means which is arranged between the photo sensing unit and said output amplifier and can change the potential level to lead the electric signal in the photo sensing unit to the output amplifier.

11. An apparatus according to claim 10, wherein said control means changes the potential level of said gate means, thereby changing said draining performance.

12. A non-linear photoelectric converting apparatus comprising:
    (a) a photo sensing unit for converting a photo signal into an electric signal;
    (b) draining means for removing the electric signal of a level above a predetermined level in the electric signal formed in said photo sensing unit from the photo sensing unit; and
    (c) control means for allowing the photo signal to be converted into the electric signal and accumulated in said photo sensing unit for a predetermined period, and for gradually changing said predetermined level within said predetermined period.

13. An apparatus according to claim 12, wherein said control means gradually increases said predetermined level within said predetermined period.

14. An apparatus according to claim 12, wherein said draining means includes gate means for leading the electric signal in said photo sensing unit to a portion out of the photo sensing unit.

15. An apparatus according to claim 14, wherein said photo sensing unit includes a storage unit to store the electric signal.

* * * * *

UNITED STATES PATENT AND TRADEMARK OFFICE
CERTIFICATE OF CORRECTION

PATENT NO. : 4,742,238  Page 1 of 3
DATED : May 3, 1988
INVENTOR(S) : YUICHI SATO It is certified that error appears in the above-identified patent and that said Letters Patent is hereby corrected as shown below:

IN THE DRAWINGS

Sheet 1, Fig. 1, "CONVERTOR" should read --CONVERTER--.
Sheet 11, Fig. 17, "SUTURATION" should read --SATURATION--.
                  LEVEL                             LEVEL

COLUMN 2

Line 59, "apparauts" should read --apparatus--.

COLUMN 4

Line 60, "becomes" should read --and becomes--.

COLUMN 7

Line 25, "pl" should be deleted.

COLUMN 8

Line 55, "quantiy $\alpha$" should read --quantity $\alpha$--.

COLUMN 9

Line 11, "of" should read --has--.
Line 62, "change" should read --charge--.

COLUMN 10

Line 40, "quantitY" should read --quantity--.
Line 45, "as" should read --are--.

UNITED STATES PATENT AND TRADEMARK OFFICE
CERTIFICATE OF CORRECTION

PATENT NO. : 4,742,238

DATED : May 3, 1988

INVENTOR(S) : YUICHI SATO

It is certified that error appears in the above-identified patent and that said Letters Patent is hereby corrected as shown below:

COLUMN 11

Line 45, "gnerator 34" should read --generator 34--.
Line 65, "bit" should read --bits--.

COLUMN 12

Line 14, "124a an" should read --124a, an--.

COLUMN 13

Line 3, "$SW_3$=and" should read --$SW_3=1$ and--.
Line 4, "$t_0=0$," should read --$t_0=1$,--.
Line 6, "signals become" should read --signals $SW_1$, $SW_2$, and $SW_4$ to $SW_7$ become--.
Line 16, "$SW_5 = \{t_5 + T_4\}* \cdot t_3$" should read
--$SW_5 = \{t_5 + t_4\}* \cdot t_3$--.
Line 31, "(1=0)" should read --(t=0)--.
Line 42, "$(-k/R_0)$ therefore," should read
--$(-k/R_0)$. Therefore,--.
Line 47, "te" should read --the--.

COLUMN 15

Line 2, "gates 13" should read --gates 43--.
Line 5, "characterisitc," should read --characteristic,--.
Line 39, "charge" (second occurrence) should read --charges--.

UNITED STATES PATENT AND TRADEMARK OFFICE
CERTIFICATE OF CORRECTION

PATENT NO. : 4,742,238

DATED : May 3, 1988

INVENTOR(S) : YUICHI SATO

It is certified that error appears in the above-identified patent and that said Letters Patent is hereby corrected as shown below:

COLUMN 16

Line 3, "$F_4$," should read --$f_4$,--.

COLUMN 17

Line 8, "photoelectirc" should read --photoelectric--.

Signed and Sealed this

Twenty-seventh Day of September, 1988

Attest:

DONALD J. QUIGG

Attesting Officer      Commissioner of Patents and Trademarks